(12) United States Patent
Bird et al.

(10) Patent No.: US 6,997,064 B2
(45) Date of Patent: Feb. 14, 2006

(54) FLUID METERING AND CONTROL DEVICE

(76) Inventors: Anton Bird, 2500 N. 45th St. #5, Seattle, WA (US) 98103; Andrew Chamberlain, 2400 16th St. NW. #338, Washington, DC (US) 20009

(*) Notice: Subject to any disclaimer, the term of this patent is extended or adjusted under 35 U.S.C. 154(b) by 0 days.

(21) Appl. No.: 10/435,483

(22) Filed: May 9, 2003

(65) Prior Publication Data

US 2003/0233885 A1 Dec. 25, 2003

Related U.S. Application Data

(60) Provisional application No. 60/379,429, filed on May 9, 2002.

(51) Int. Cl.
*G01F 1/28* (2006.01)
*G01F 14/00* (2006.01)

(52) U.S. Cl. ..................... 73/861.75; 73/149

(58) Field of Classification Search .......... 73/861.75, 73/861.76, 861.77, 861.78, 861.79, 861.81, 73/861.82, 861.83, 861.84, 861.85, 861.89, 73/861.91, 861.92, 861.94, 149
See application file for complete search history.

(56) References Cited

U.S. PATENT DOCUMENTS

| | | | | |
|---|---|---|---|---|
| 4,057,173 A | * | 11/1977 | Tal | 222/20 |
| 4,798,092 A | * | 1/1989 | Lagergren et al. | 73/861.77 |
| 4,883,199 A | * | 11/1989 | Ouarve et al. | 222/14 |
| 4,936,508 A | * | 6/1990 | Ingalz | 239/72 |
| 5,261,275 A | * | 11/1993 | Davis | 73/258 |
| 5,363,989 A | * | 11/1994 | Zeamer et al. | 222/16 |
| 5,372,048 A | * | 12/1994 | Dunbar | 73/861.91 |
| 5,659,300 A | * | 8/1997 | Dresselhuys et al. | 340/870.02 |
| 5,932,814 A | * | 8/1999 | Hutchinson | 73/861.75 |
| 6,016,836 A | * | 1/2000 | Brunkhardt | 137/624.11 |
| 6,257,073 B1 | * | 7/2001 | Lee et al. | 73/861.91 |
| 6,389,909 B1 | * | 5/2002 | Johnson et al. | 73/861.78 |
| 6,397,687 B1 | * | 6/2002 | Garmas | 73/861.79 |
| 6,494,107 B1 | * | 12/2002 | Kazazian | 73/861.79 |
| 6,502,451 B1 | * | 1/2003 | Fourie | 73/40.5 R |
| 6,556,142 B1 | * | 4/2003 | Dunstan | 340/606 |
| 6,705,534 B1 | * | 3/2004 | Mueller | 236/12.12 |

FOREIGN PATENT DOCUMENTS

| DE | 3842857 A1 | * | 6/1990 |
|---|---|---|---|
| JP | 02023917 A | * | 1/1990 |

* cited by examiner

*Primary Examiner*—Charles Garber
(74) *Attorney, Agent, or Firm*—Mark D. Byrne; Black, Lowe & Graham PLLC

(57) ABSTRACT

A fluid measuring device that displays fluid volume usage against fluid volume limits and a fluid control device that stops fluid delivery when the fluid volume limit is reached.

17 Claims, 5 Drawing Sheets

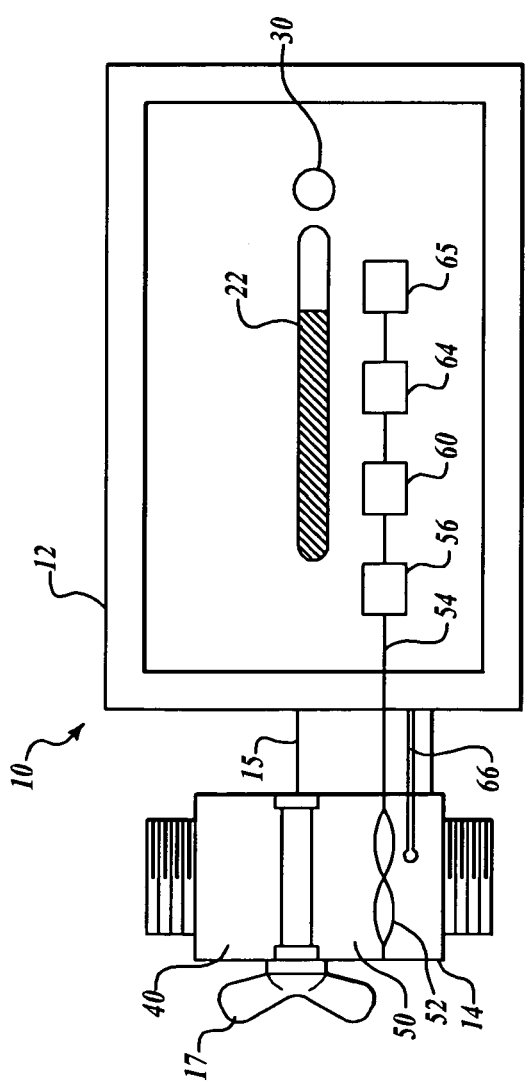
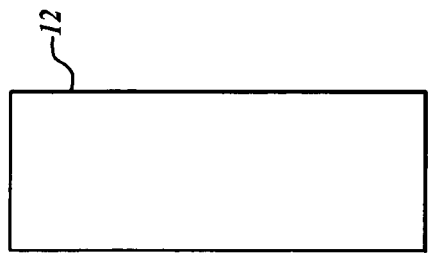
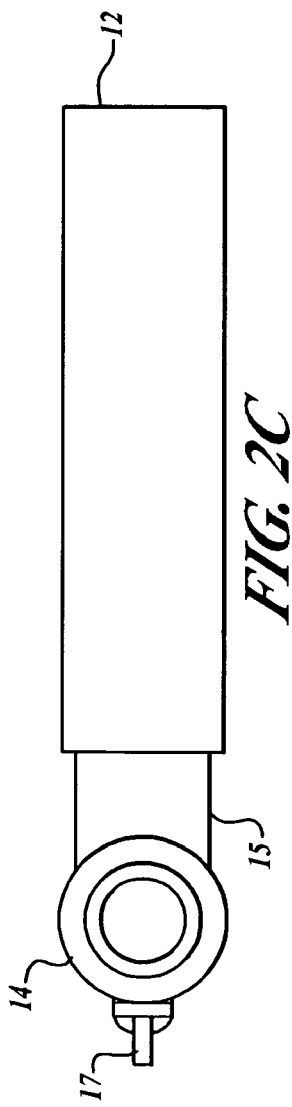
FIG. 2A
FIG. 2B
FIG. 2C

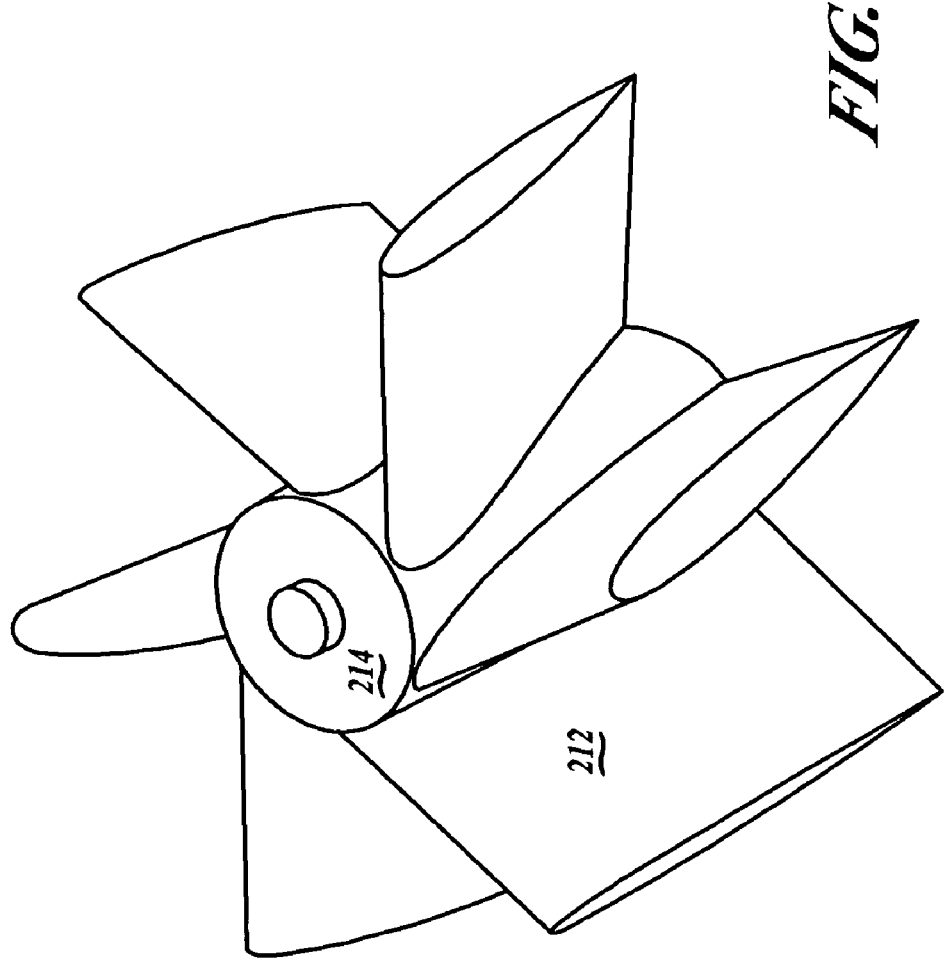

FLUID METERING AND CONTROL DEVICE

PRIORITY CLAIM

This invention claims priority to provisional U.S. patent application Ser. No. 60/379,429 filed May 9, 2002, herein incorporated by reference.

FIELD OF THE INVENTION

This invention relates generally to devices that control and measure fluid volume.

BACKGROUND OF THE INVENTION

Most water conservation devices use timers attached to water control systems. Unfortunately, typical users of time-controlled water conservation devices are unable to equate water flow over a period of time with the true water volume or mass. Even if users of time-based water conservation devices generally recognize that time is proportional to the volume of water consumption, they often have difficulty in their conservation effort because they do not know the water volume to time ratio or cannot apply the ratio to the time used. Accordingly, consumers using timer-based water conservation devices do not alter their consumption practices. Such timer-based devices have not helped in the general water conservation efforts and programs offered by municipalities and state governments.

Time-based water conservation devices used today also lack the ability to convey water usage information in real time. Further, they lack the ability to control water volume or mass usage, rather than merely controlling time. Consequently, water users are unable to truly monitor and conserve water usage.

Thus, there is an unmet need to provide volume-based water conservation devices in a variety of settings such as water distribution systems having showers, outdoor spigots, and faucets. The volume-based water conservation devices would encourage the voluntary attainment of individual or governmental water conservation goals.

SUMMARY OF THE INVENTION

The present invention is a fluid metering device that measures water flow rates in terms of water volume, rather than time. The various alternate embodiments incorporate additional features, including the ability to control water flow rates, present water usage information to the user, inform the user when water conservation goals have been met, and alert the user when water conservations goals have not been met. The fluid metering and control device can be attached to showers, spigots, and water faucets. Preferred embodiments of the fluid metering and control device include an electromechanical embodiment and a mechanical embodiment.

The preferred electromechanical embodiment presents the status of water conservation goals as determined by the manufacturer or otherwise established to encourage water conservation, but does not automatically shut off the flow of water whether the conservation goals are met or not met. Water usage information is presented to encourage the user to voluntarily decrease or shut off the flow of water. The preferred mechanical embodiment allows the user to select volume-based water conservation goals and automatically shuts of the flow of water once a volume selected for delivery is delivered.

The preferred electromechanical embodiment includes a plurality of digital displays and a water flow controller. The plurality of digital displays includes a water usage rate display, a water volume target display, a proportion-of-water target display, and an alert alarm. The proportion-of-water target display includes graphical presentations such as an indicator bar, an indicator column, a radial filled-in pie chart, or a numerical percentage or fractional indication of the water volume target. The alert alarms are visible, audible, or vibrational indicators.

The preferred electromechanical embodiment measures water usage rates, measures water volume, displays the water volume target, graphically or numerically informs when the proportion-of-water target is delivered, and alerts the user when the water volume target is reached or exceeded. The water volume target is preset during manufacture by programming into the device a value representing the water volume target to be used at the point-of-use for each cycle-of-use in a water distribution system.

The preferred electromechanical embodiment of the instant invention is attachable to any water point-of-use location such as showers, sinks, or outdoor spigots. The water flow controller is an adjustable handle or knob. The water flow controller allows the user to alter or adjust water flow rates with a concomitant display of the changes in flow rates and the changes in the proportion-of-water target display. Water conservation goals are promoted by displaying to the user the preset water volume target, the current flow rates, the proportion-of-water target display, and a signal alert presented when the maximum water volume target is reached or exceeded. Thus, the user is encouraged to voluntarily decrease the rate of water usage or turn off the water. The user's knowledge of the status of water consumption encourages the user to conserve the rate and volume of water used for each cycle-of-use at each point-of-use. The plurality of digital displays presents information regarding water use, and, via the adjustable handle or knob, allows the user to timely and voluntarily act on that information to develop and establish water conservation practices. The electromechanical embodiment may be installed at entry points to structures to measure and present water usage rates, volumes, and proportion-of-target volumes to a structure or building as a whole.

The preferred mechanical embodiment includes a dial that may be turned to a numerical setting to establish the water target volume to be delivered to the water distribution systems, and water delivery commences with the engagement of a start flow button. Once the numerical setting is reached, the mechanical embodiment shuts off and stops the flow of water. Resetting the numerical setting or adjusting the dial to a new water target volume allows the start flow button to be reengaged for delivery of another flow of water until the new water target is reached. The mechanical embodiment is suitably attached to any water source, including outdoor-based water distribution systems such as hoses and water sprinkling arrays. The mechanical embodiment can also be used indoors.

BRIEF DESCRIPTION OF THE DRAWINGS

The preferred and alternative embodiments of the present invention are described in detail below with reference to the following drawings.

FIG. 2A is a partial cut away front view of the preferred electromechanical embodiment revealing internal mechanisms for measuring consumption rates and converting consumption rates into volume consumed;

FIG. 2B is a side view of the preferred electromechanical embodiment;

FIG. 2C is a bottom view of the preferred electromechanical embodiment;

FIG. 5 is a pictorial depiction of alternate embodiment of a propeller used in the preferred electromechanical and mechanical embodiments of the invention.

DETAILED DESCRIPTION OF THE INVENTION

Figure 1:
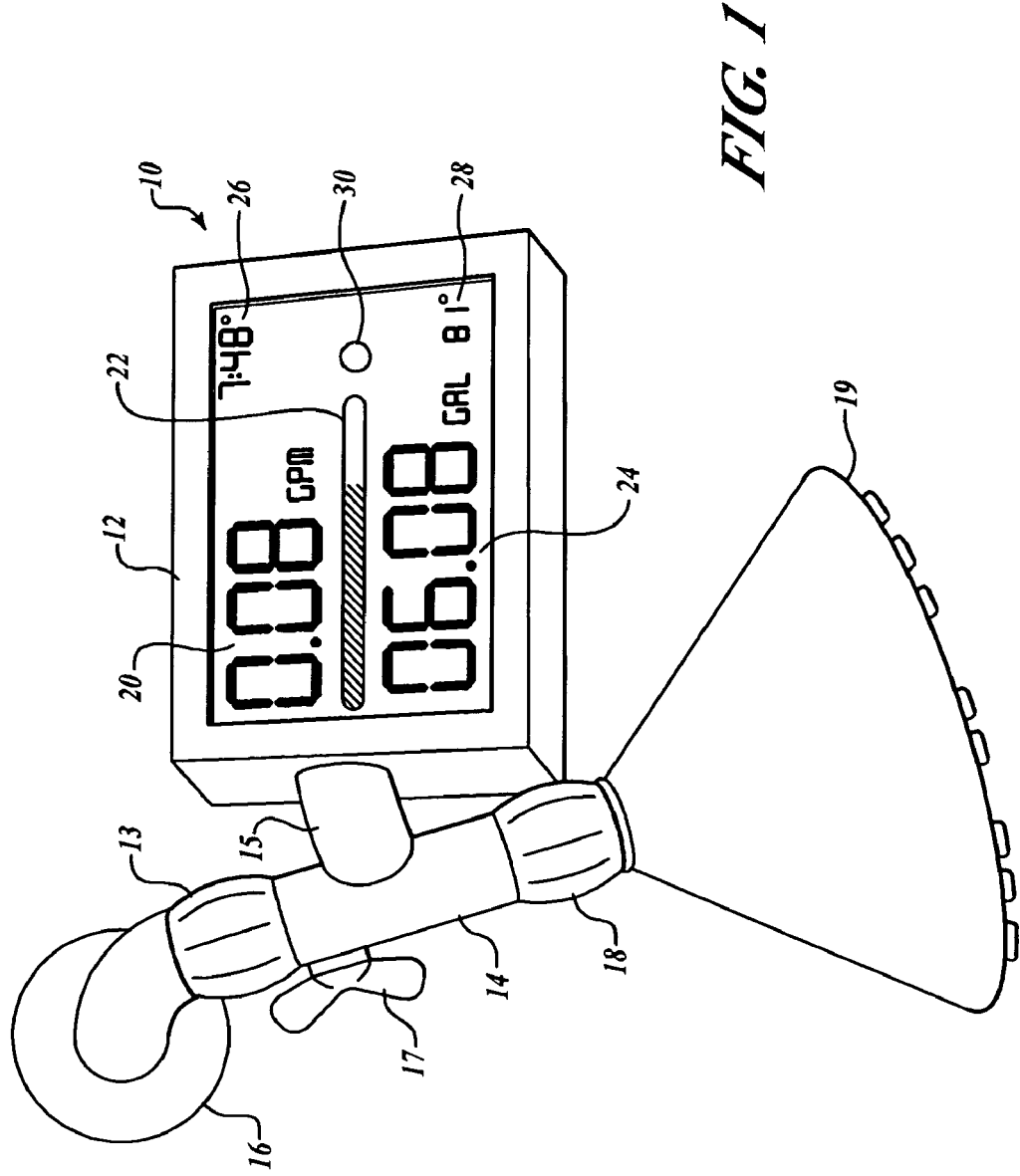
FIG. 1 is a schematic diagram of the preferred electromechanical embodiment of invention.

The present invention comprises a device for measuring and controlling fluid consumption. By way of example, the details of the preferred electromechanical embodiment are shown in FIG. 1. A digital fluid metering and control device 10 is shown having a housing 12 attached to a tee 15 from a water pipe 14 attached to a plumbing fixture 16 via a first coupler 13.

The digital device 10 is battery operated to power a plurality of digital displays. The displays may be LED, LCD, or any other form. A volume rate display 20 presents a first digital number that expresses the water flow rate in gallons per minutes (GPM). A volume display 24 presents a second digital number that indicates the desired target volume to be delivered in gallons (GAL). In the preferred embodiment, the targeted water volume is preprogrammed into the digital device 10 by the manufacturer and unalterable by the user. Alternatively, targeted water volumes may be set by the user. Different water flow rate and water volume units can be displayed by the volume rate display 20 and the volume display 24.

A temperature display 28 presents a third digital number that expresses the water temperature in Fahrenheit, centigrade or Kelvin units.

A graphical bar display 22 presents the proportion of the targeted water volume that has been delivered. The length of the bar display as presented by the graphical display 22 is proportionate to the targeted water volume programmed into the device 10 and presented on volume display 24. Adjacent to the graphical bar display 22 is a target-indicator 30 that illuminates when the targeted water volume has been delivered.

A clock display 26 presents a fourth digital number that indicates the current time of day. Other graphical forms can be presented by the graphical display 22. For example, other graphical forms include columns, filled-in pie charts, or numerical percentage or decimal fraction values.

An adjustment handle 17 controls water flow rates via a water flow valve inside the pipe 14. The user manipulates the adjustment handle 17 to adjust water flow rates. The up (increase) or down (decrease) changes in the water flow rates are displayed in the volume rate display 20 as the user manipulates the adjustment handle 17. Water delivered downstream of the digital device 10 travels through the pipe 14 and then to a shower head 19 attached to the pipe 14 via a second coupler 18.

Because adjustment of the handle 17 affects the values presented by the volume rate display 24 and the bar presented by the graphical display 22, the user can readily appreciate the effect of changes in water flow rates. Once the targeted water volume has been reached, the target indicator 30 is illuminated, signaling to the user to turn off the water being delivered to the water fixture 16. Should the user shut off the water to the water fixture 16 in response to the illumination of the target indicator 30, or before the illumination of target indicator 30, water conservation goals are met for the cycle of water use. The preferred digital device 10 does not automatically shut off the flow of water to the water fixture 16, although in alternate embodiments the water controller may be programmed to do so. If the user does not turn off the water delivered to the water fixture 16 after the target indicator 30 is illuminated, the continued water delivery to the water fixture 16 signals to the user that water conservation goals are not met. The continued illumination of the target indicator 30 serves to alert and encourage users to shut off the water delivered to the water fixture 16.

FIG. 2A shows the internal workings of the electromechanical embodiment 10. A temperature probe 66 projects from the housing 12 into a space 50 defined by the interior of the water pipe 14. The temperature probe 66 is in communication with the temperature display 28 to indicate the temperature of the water traveling through the pipe 14.

Inside the housing 12 is an axle 54 that projects from the housing 12 through the tee 15 and into the space 50. As the water enters the space 50, the water engages a fan-shaped fin 52 attached to the axle 54, causing the fin 52 to rotate and spin the axle 54. Although a fin is used in the preferred embodiment, in alternate embodiments fins of different shapes, or other water-flow sensing devices, may be used.

Attached to the axle 54 inside the housing 12 is an electromagnetic sensor 56 that generates electrical pulses with the movement of the axle 54. An analog to digital converter (ADC) 60 is coupled to the sensor 56. The ADC 60 changes the analog signals generated by the electromagnetic sensor 56 to digital signals. The digital signals from the ADC 60 are sent to a central processing unit (CPU) 64. A memory 65 is coupled to the CPU 64, and stores volume target levels, programming instructions for determining information to be presented on the display, and data such as the current volume and flow rate. The CPU 64 processes the digital signals to determine the volume flow rate and volume that are respectively sent to the volume rate display 20 and the volume display 24. A charging device—a battery, solar cell, or generator/alternator—provides power for the processing and display.

Attached to the water pipe 14 is the adjustable handle 17. The adjustable handle 17 is connected to a flow valve 40 that rotates with the adjustable handle 17. The rotation of the flow valve 40 restricts the flow of water inside the water pipe 14. FIG. 2B depicts a side view of the housing 12. FIG. 2C depicts a bottom view and shows the housing 12 attached to the water pipe 14 via the tee 15.

Figure 3:
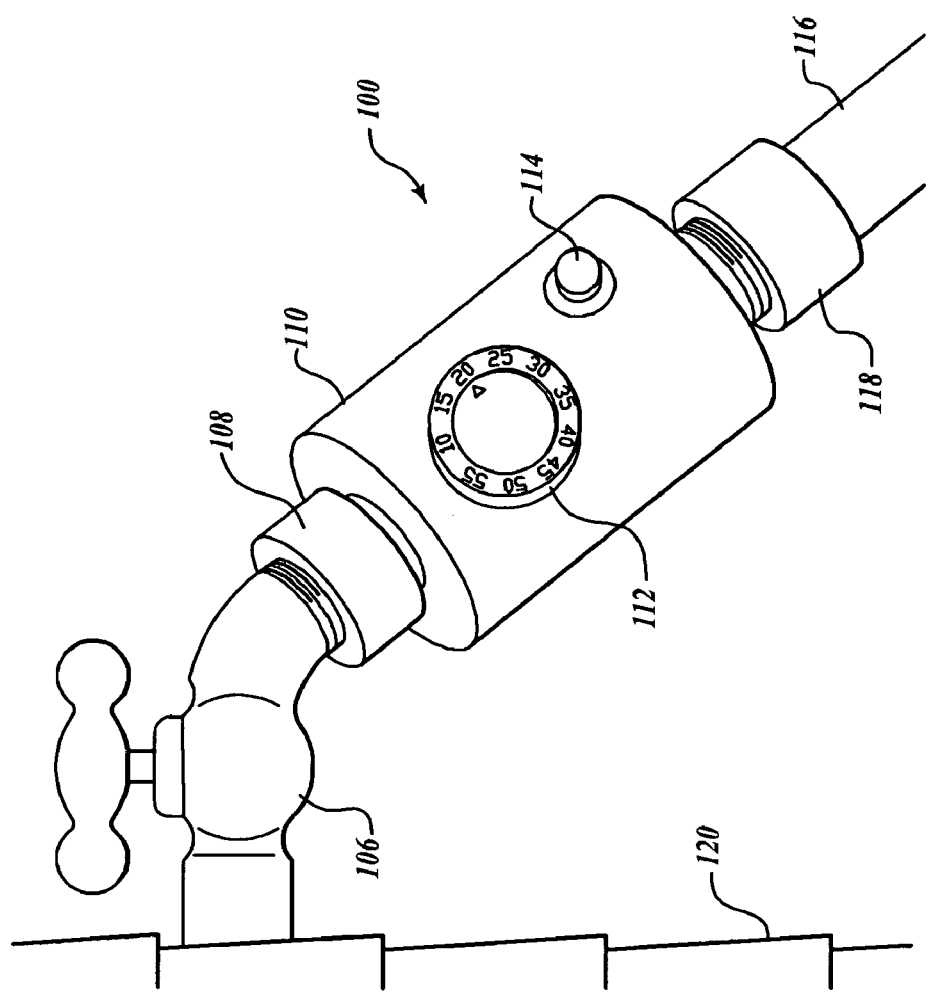
FIG. 3 is a pictorial diagram of the preferred mechanical embodiment of the invention attached to a spigot.

FIG. 3 depicts the preferred mechanical embodiment 100 of the invention. In the mechanical embodiment a housing 110 includes an exterior-mounted target volume dial 112 and a start flow button 114. A first end of the housing 110 is attached to a spigot 106 via a first coupler 108. The spigot 106 is attached to a building 120 as shown, but can alternatively take other forms, such as at the end of a hose or protruding from the ground. A second end of the housing 110 is attached to a hose 116 via a second coupler 118.

Inside the mechanical embodiment 100 is a similarly arranged helical fin as in the electromechanical embodiment 10 except there is neither an ADC nor a CPU in the mechanical embodiment 100 because it lacks the displays. The volume or mass flow is measured by rotation of the helical fin 52 and the axle 54 connected directly to the target volume dial 112 through a gear system. The gear system correlates the spinning of the axle 54 to the movement of the target volume dial 112 to be proportional to the volume of water delivered passed the helical fin 52. Accordingly, the gears step-down the fast-spinning axle 54 to produce a more slowly-turning volume dial 112. Once the desired water volume has passed through the mechanical embodiment 100, a spring-loaded butterfly valve inside the mechanical embodiment 100 snaps shut. The butterfly valve is reopened by resetting the target volume dial 112 and pressing the start flow button 114 to start another water delivery cycle.

Figure 4:
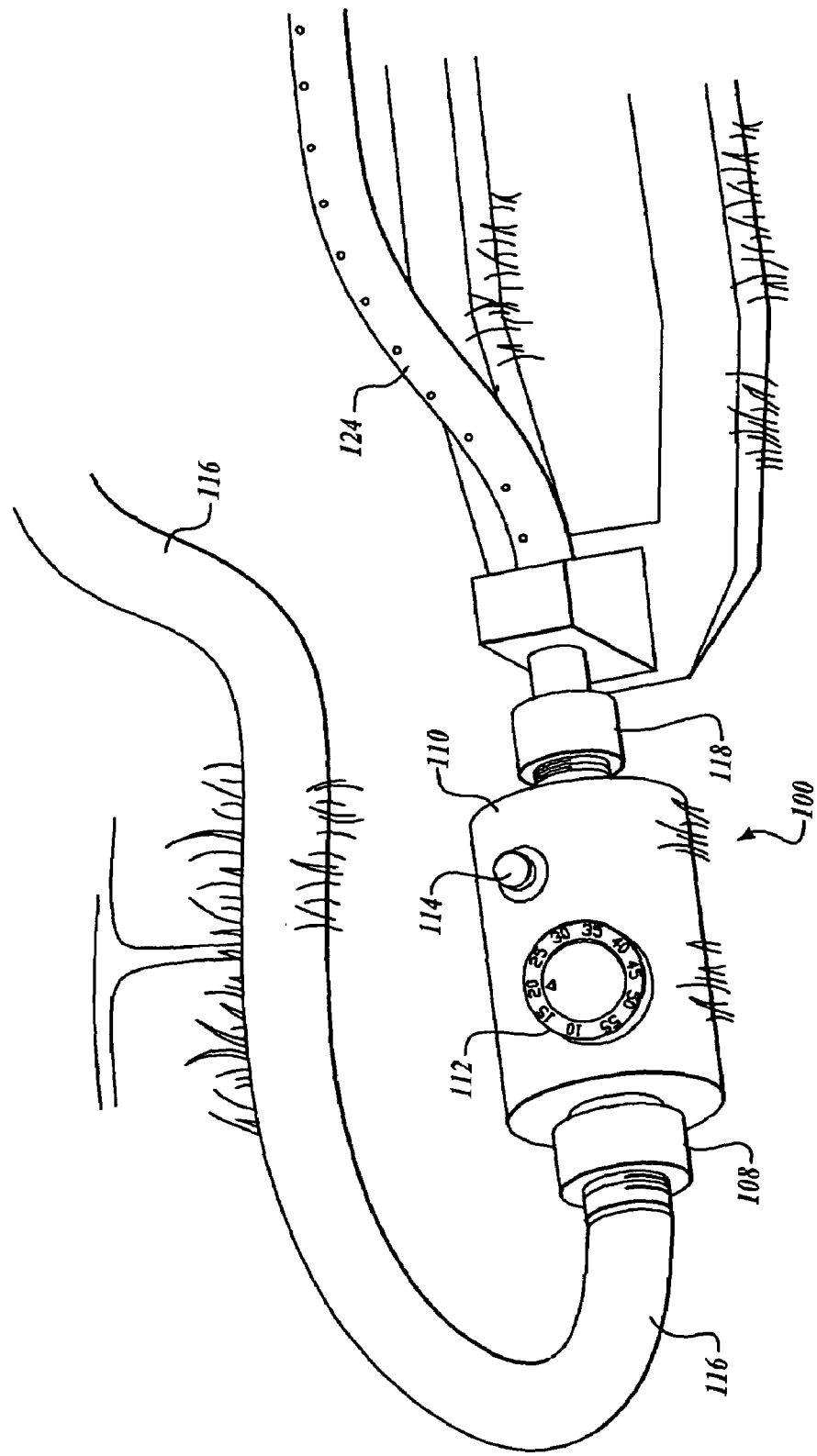
FIG. 4 is pictorial depiction of the preferred mechanical embodiment attached to a water sprinkler.

Another application of the mechanical embodiment 100 is shown in FIG. 4. The target volume dial 112 and the start flow button 114 are shown on the housing 110 of the mechanical embodiment 100. The hose 116 is connected to the housing 110 via the first coupler 108. A water sprinkler 124 is attached to the housing 110 via the second coupler 118.

The operation of the electromechanical embodiment 10 occurs when the shower is turned on and water flows through the water pipe 14. The transit of the water within the space 50 engages the helical fins 52. The helical fins 52 then rotate within the space 50, causing the axle 54 to rotate as well. The electromagnetic sensor 56 generates analog electric signals in response to the rotation of the axle 54 caused by the flow of water acting on the helical fins 52. The analog electric signals are sent from electromagnetic sensor 56 to the ADC 60, which converts them to digital signals. The digital signals are then sent to the CPU 64 for processing. The CPU 64 then presents the digital signals as volume flow rate data on the volume rate display 20, as volume consumed on the volume display 24 and as a percent or proportion of target value on the graphical display 22. Once the maximum target value is delivered, the digital fluid metering and control device 10 illuminates the target indicator 30.

The mechanical embodiment 100 operates when the user turns the target volume dial 112 to a numerical location that identifies the volume to be delivered. The turning of the volume dial 112 causes the spring-loaded butterfly valve to reset and allows the passage of water through the mechanical embodiment 100 upon pressing the start flow button 114. The volume or mass flow is measured by having the helical fin 52 and the axle 54 connected directly to the target volume dial 112 through the gear system. The gear system calibrates the spinning of the axle 54 to the movement of the target volume dial 112 to be proportional to the volume of water delivered passed the helical fin 52. Once the desired water volume has passed through the mechanical embodiment 100, the spring-loaded butterfly valve inside the mechanical embodiment 100 snaps shut. The butterfly valve is reopened by resetting the target volume dial 112 and pressing the start flow button 114 to start another water delivery cycle.

FIG. 5 is a pictorial depiction of alternate embodiment of a propeller used in the preferred electromechanical and mechanical embodiments of the invention. A turbine fan propeller 212 is depicted with six blades radially disposed around a centrally located cylinder 214. The six blades are slightly twisted with respect to the central axis of the cylinder 214. In the preferred alternate embodiments, the turbine fan propeller 212 occupies the space 50 in the water pipe 14. The cylinder 214 is in mechanical communication with the axle 54 of the electromechanical embodiment 10 and the mechanical embodiment 100.

In addition to the above preferred embodiments, many variations are possible. For example, the electromechanical embodiment may include the automatic shutoff feature incorporated in the mechanical embodiment. As another variation, the electromechanical embodiment could be constructed without an accompanying water control handle as shown, instead relying on the water control valve already present in showers or other spigots.

We claim:

1. A device to measure fluid output at a source comprising:
   a propeller in contact with a fluid;
   a motion sensor in communication with the propeller, the motion sensor configured to generate an electrical signal in proportion to the amount of motion;
   an analog to digital converter configured to receive the electrical signal and convert it to a digital signal; and
   a central processor unit having a display and programmable to determine, store, and present on the display
      a fluid volume limit,
      a fluid volume usage level based upon the cumulative motion of the propeller,
      a proportion of fluid volume limit as a graphic representation; and
   a user-adjustable valve for adjusting at the source, in response to the display, the fluid volume usage level.

2. The device of claim 1, wherein the central processing unit is configured to display fluid temperatures.

3. The device of claim 1, wherein the device is configured specifically to be attachable to a showerhead.

4. The device of claim 1, wherein the central processor unit is remotely monitored and controlled.

5. The device of claim 1, wherein the values of the fluid volume limit as displayed on the central processing unit are remotely controlled.

6. The device of claim 1, wherein the graphic representation comprises bars, columns, pie charts, percentage, and decimal fraction values.

7. The device of claim 1, wherein the central processor unit generates and sends an alerting signal whenever the fluid volume usage level equals or exceeds the fluid volume limit.

8. The device of claim 7, wherein the alerting signal is audible or visual.

9. The device of claim 1, wherein the fluid volume limit is alterable by the user.

10. The device of claim 1, wherein the fluid volume limit is not alterable by the user.

11. The device of claim 10, wherein alphanumeric graphic includes bars, columns, pie charts, percentage, and decimal fraction values.

12. A device to measure fluid output at a source comprising
   a propeller in contact with a fluid;
   a motion sensor in communication with the propeller, the motion sensor configured to generate an electrical signal in proportion to the amount of motion;
   an analog to digital converter configured to receive the electrical signal and convert it to a digital signal; and
   a central processor unit having a display and programmable to determine, store, and present on the display
      a fluid volume limit,
      a fluid volume usage level based upon the cumulative motion of the propeller,
      proportion of fluid volume limit presented as an alphanumeric graphic; and
   a user-adjustable valve for adjusting at the source, in response to the display, the fluid volume usage level.

13. The device of claim 12, wherein the fluid volume limit is presented in graphical form.

14. The device of claim 12, wherein the fluid volume limit is presented in alphanumeric form.

15. The device of claim 12, wherein the fluid volume limit, the fluid volume usage, and the proportion of fluid volume limit may be reinitialized.

16. The device of claim 12, wherein the user-adjustable valve is mechanical.

17. The device of claim 12, wherein the user-adjustable valve is electromechanical.

* * * * *